(12) United States Patent
Oakley

(10) Patent No.: US 9,494,981 B2
(45) Date of Patent: Nov. 15, 2016

(54) RETRACTABLE SUPPORT MECHANISM FOR AN ELECTRONIC DEVICE

(71) Applicant: Intel Corporation, Santa Clara, CA (US)

(72) Inventor: Nicholas Oakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 14/497,884

(22) Filed: Sep. 26, 2014

(65) Prior Publication Data

US 2016/0091934 A1   Mar. 31, 2016

(51) Int. Cl.
 *G06F 1/16* (2006.01)
(52) U.S. Cl.
 CPC .......... *G06F 1/1679* (2013.01); *G06F 1/1662* (2013.01)
(58) Field of Classification Search
 CPC ....................................................... G06F 1/16
 See application file for complete search history.

(56) References Cited

U.S. PATENT DOCUMENTS

| | | | | |
|---|---|---|---|---|
| 6,700,775 B1* | 3/2004 | Chuang | ................. | G06F 1/1626 361/679.01 |
| 6,882,524 B2* | 4/2005 | Ulla | ....................... | G06F 1/1626 345/169 |
| 6,940,713 B2* | 9/2005 | Huang | ................. | G06F 1/1632 345/905 |
| 6,986,492 B2* | 1/2006 | Huang | ................. | G06F 1/1632 248/346.03 |
| 7,652,873 B2* | 1/2010 | Lee | ....................... | E05B 65/006 248/917 |
| 8,089,760 B2* | 1/2012 | Yi-Chang | ............. | G06F 1/1637 248/166 |
| 8,111,512 B2* | 2/2012 | Yeh | ....................... | G06F 1/1624 345/156 |
| 8,390,995 B2* | 3/2013 | Wang | ...................... | G06F 1/166 361/679.03 |
| 8,717,319 B2* | 5/2014 | Wu | ....................... | G06F 1/1632 206/320 |
| 8,964,381 B2* | 2/2015 | Mai | ....................... | G06F 1/1679 361/679.06 |
| 8,964,382 B2* | 2/2015 | Ashcraft | ............... | G06F 1/1656 361/679.56 |
| 9,013,863 B2* | 4/2015 | Hsu | ...................... | H05K 7/1401 206/320 |
| 9,261,910 B2* | 2/2016 | Liang | ................... | G06F 1/1632 |

(Continued)

OTHER PUBLICATIONS

USPTO Design U.S. Appl. No. 29/513,125, filed Dec. 26, 2014, 19 pages.

*Primary Examiner* — Lisa Lea Edmonds
(74) *Attorney, Agent, or Firm* — Patent Capital Group

(57) ABSTRACT

Particular embodiments described herein provide for an electronic device, such as an accessory to a tablet that includes a first housing. The first housing may include a retractable second housing support. The second housing support includes a stored configuration and a second housing support configuration. The second housing configuration is configured to support a second housing. A release can be is configured to release the second housing support from the stored configuration. A tension mechanism can pull the support into the second housing support configuration when the release is activated.

22 Claims, 18 Drawing Sheets

(56) References Cited

U.S. PATENT DOCUMENTS

| | | | |
|---|---|---|---|
| 2003/0095380 A1* | 5/2003 | Chen | G06F 1/1632 |
| | | | 361/679.41 |
| 2013/0128453 A1* | 5/2013 | Lin | G06F 3/0202 |
| | | | 361/679.56 |
| 2013/0134061 A1* | 5/2013 | Wu | G06F 1/1626 |
| | | | 206/320 |
| 2015/0062792 A1* | 3/2015 | Lee | G06F 1/1669 |
| | | | 361/679.09 |
| 2015/0092346 A1* | 4/2015 | Ben | G06F 1/166 |
| | | | 361/679.55 |
| 2015/0277494 A1* | 10/2015 | Oakley | G06F 1/1633 |
| | | | 361/679.55 |

* cited by examiner

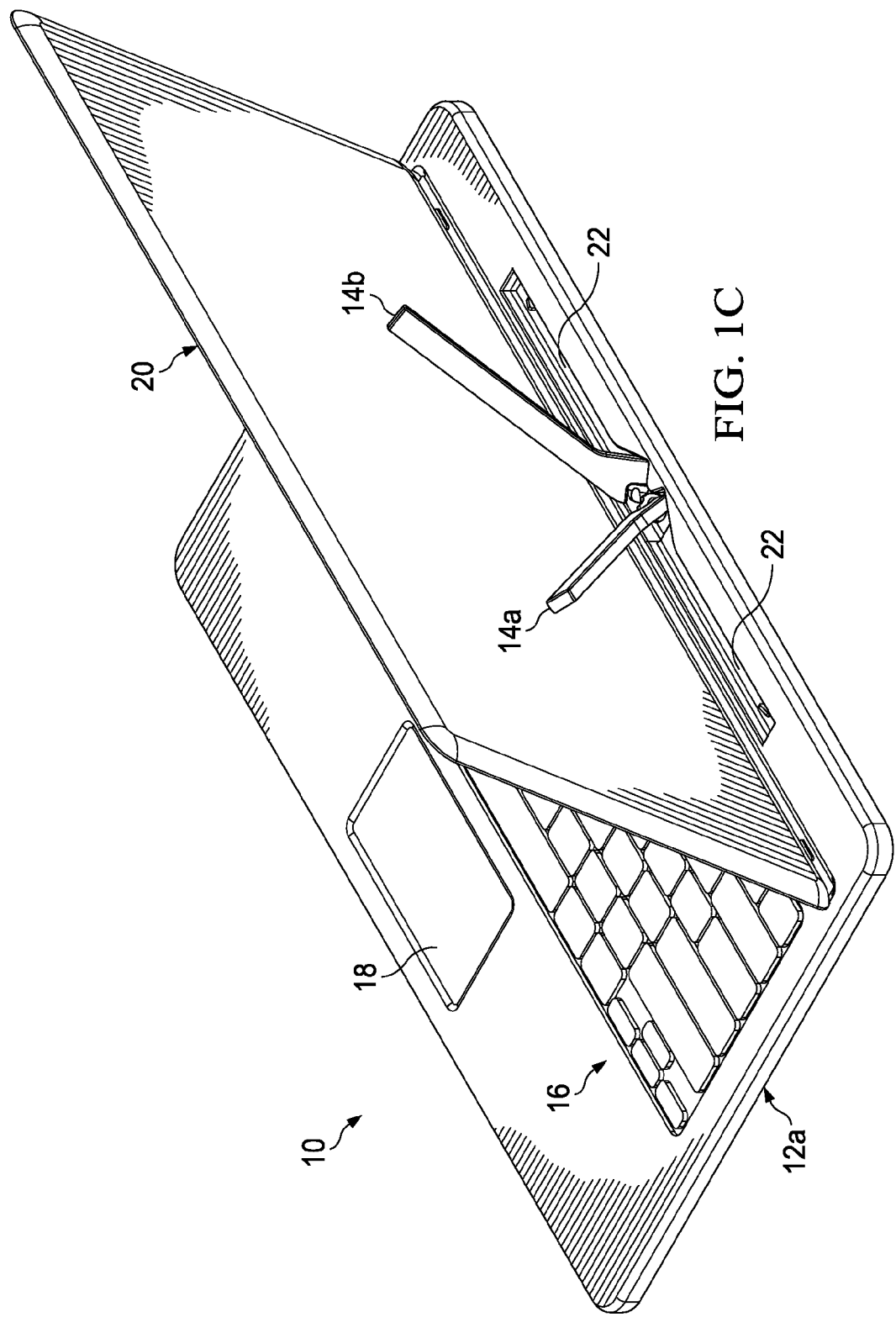

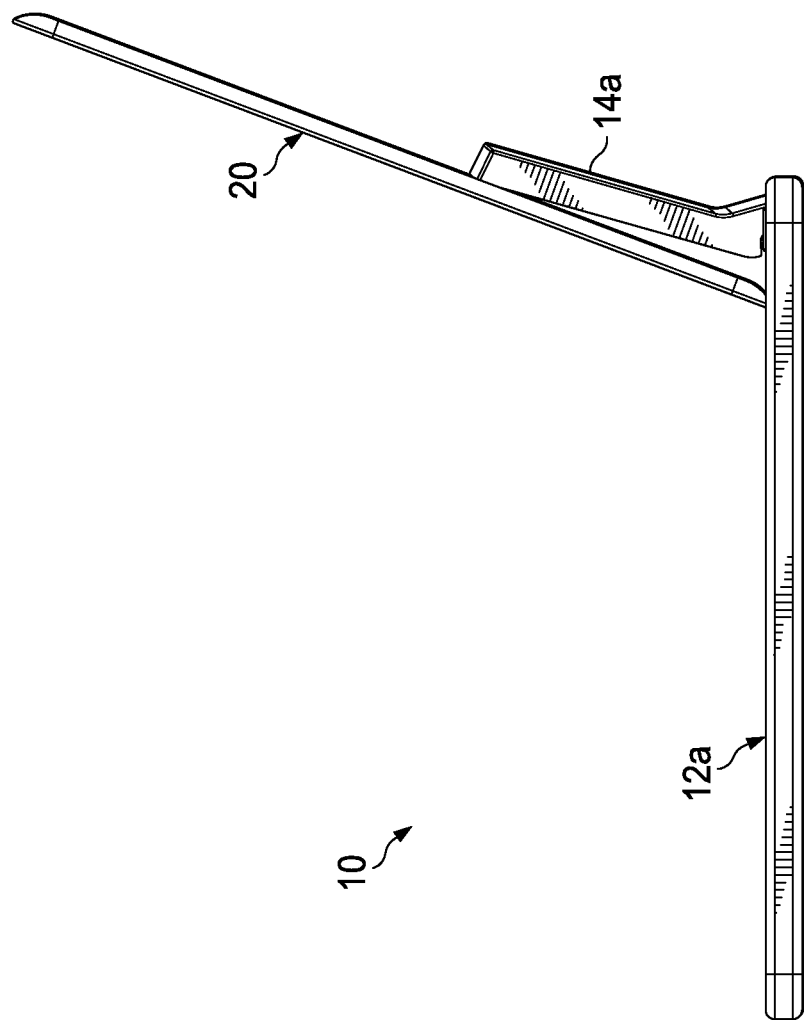

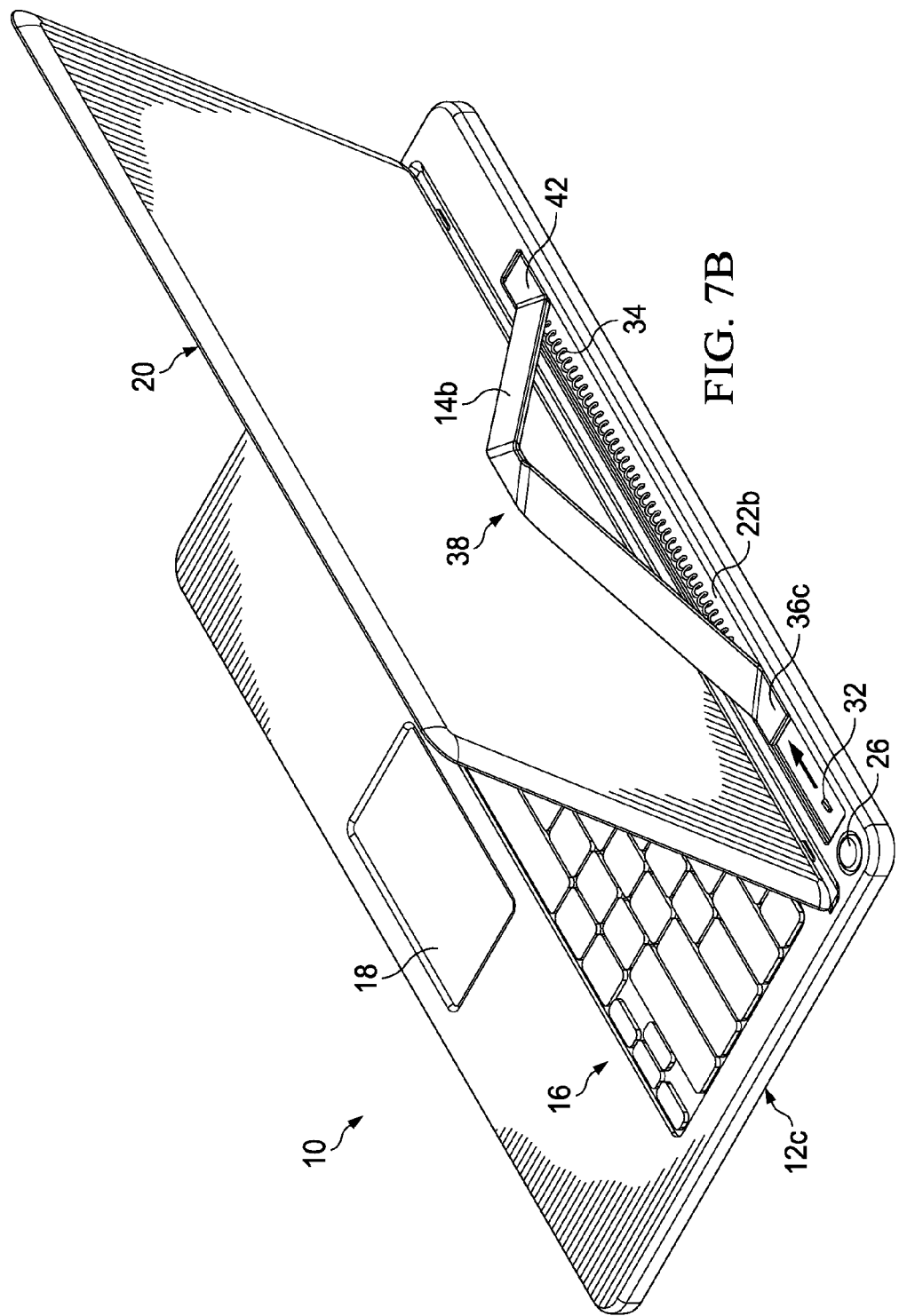

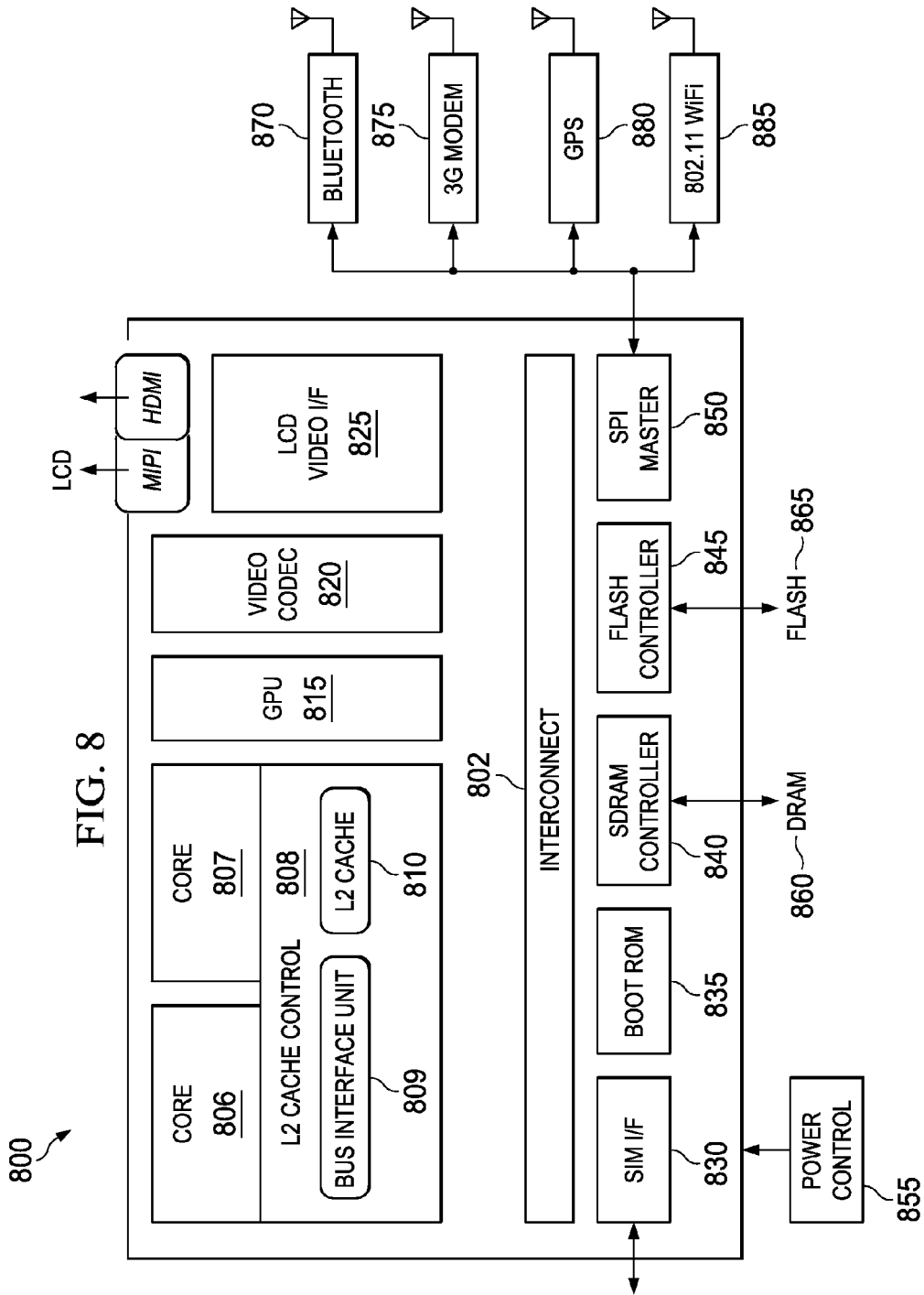

RETRACTABLE SUPPORT MECHANISM FOR AN ELECTRONIC DEVICE

TECHNICAL FIELD

Embodiments described herein generally relate to a retractable support mechanism for an electronic device.

BACKGROUND

End users have more electronic device choices than ever before. A number of prominent technological trends are currently afoot (e.g., more computing devices, more detachable displays, etc.), and these trends are changing the electronic device landscape. With the recent touch optimized operating system (OS) release for tablets, convertible or hybrid laptops have become popular. The convertible laptop is any type of computer system that has a display and can essentially function as either a laptop or a tablet computer. Often, the display can be detached from the keyboard. One of the technological trends is a growing demand for extremely light and thin keyboards to reduce the bulk and weight of the electronic devices. However, this can create a problem of tipping of the electronic device as the device can be top heavy. Hence, there is a challenge in providing an electronic device that allows for support of a display when the electronic device is coupled to the display.

BRIEF DESCRIPTION OF THE DRAWINGS

Embodiments are illustrated by way of example and not by way of limitation in the FIGURES of the accompanying drawings, in which like references indicate similar elements and in which:

FIG. 1C is a simplified schematic diagram illustrating an orthographic view of an embodiment of an electronic device, in accordance with one embodiment of the present disclosure;

FIG. 1D is a simplified schematic diagram illustrating a side view of an embodiment of an electronic device, in accordance with one embodiment of the present disclosure;

FIG. 7B is a simplified schematic diagram illustrating an orthographic view of an electronic device, in accordance with one embodiment of the present disclosure;

FIG. 8 is a simplified block diagram associated with an example ARM ecosystem system on chip (SOC) of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

An electronic device is provided in one example embodiment and includes a plurality of electronic components (which can include any type of components, elements, circuitry, etc.). One particular example implementation of the electronic device may include a first housing. The first housing can include a retractable second housing support, where the second housing support includes a stored configuration and a second housing support configuration. The second housing configuration is configured to support a second housing. A release can be configured to release the second housing support from the stored configuration. A tension mechanism can pull the second housing support into the second housing support configuration when the release is activated.

In an embodiment, the release is an electrical release such as a proximity sensor. In another embodiment, the release is a mechanical release. Additionally, the release can be activated when the second housing comes into contact with the mechanical release. The second housing support can be housed in the body of the first housing such that the first housing has a relatively smooth profile. In certain examples, the second housing support includes two supports and the two supports transition from the stored configuration to the second housing support configuration on bevel gears that rotate about symmetrical canted axes.

In other examples, the second housing support includes opposite sliding ends. The opposite ends can be pulled towards each other by a tension mechanism and a preformed deformation area can allow the second housing support to transition into the second housing support configuration when the release is activated. In another example, the second housing support includes one sliding end and one secured end that does not slide. The sliding end can be pulled towards the secured end by the tension mechanism and a preformed deformation area can allow the second housing support to transition into the second housing support configuration when the release is activated Example Embodiments The following detailed description sets forth example embodiments of apparatuses, methods, and systems relating to retractable support mechanism configurations for an electronic device. Features such as structure(s), function(s), and/or characteristic(s), for example, are described with reference to one embodiment as a matter of convenience; various embodiments may be implemented with any suitable one or more of the described features.

Figure 1A:
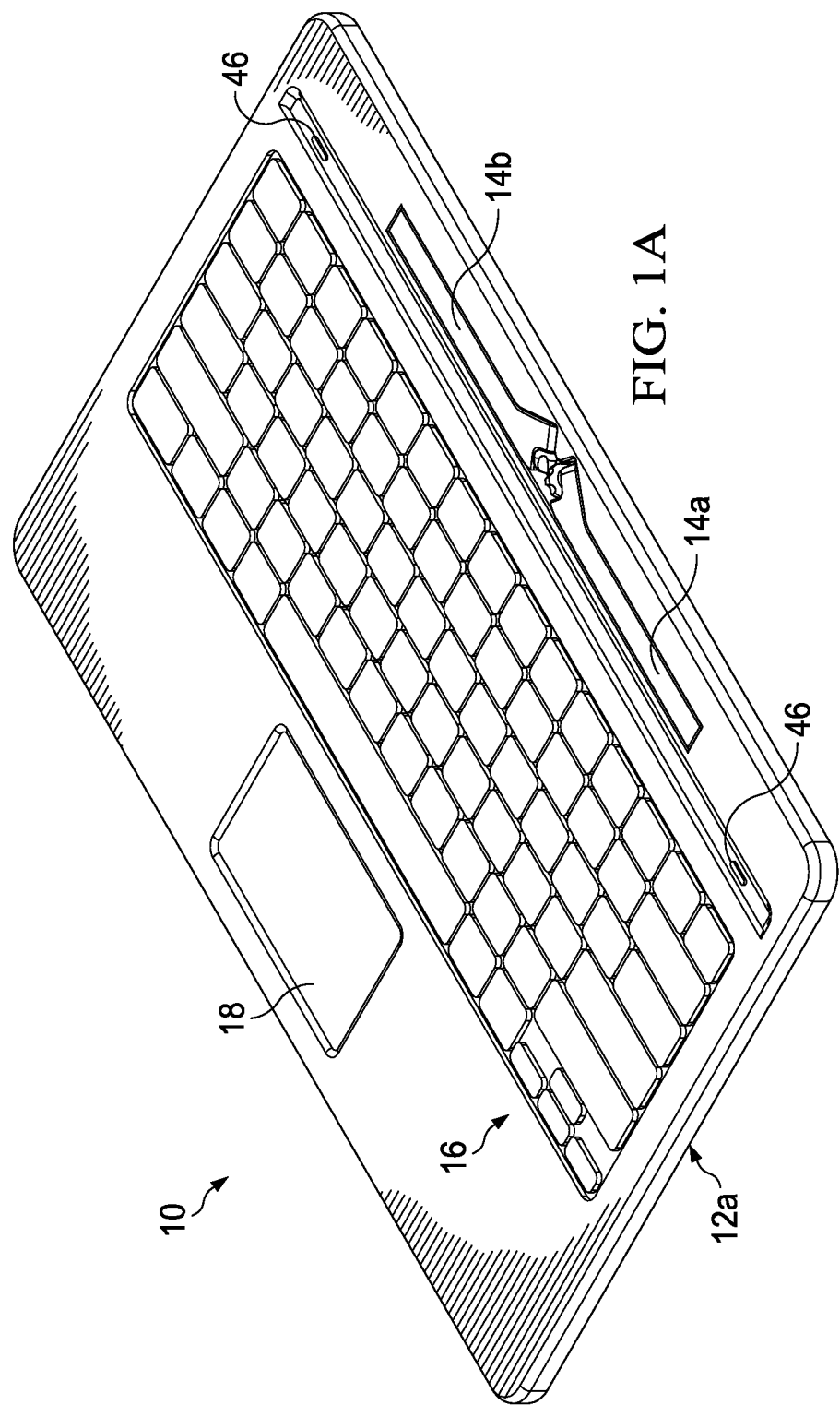
FIG. 1A is a simplified schematic diagram illustrating an orthographic view of an embodiment of an electronic device, in accordance with one embodiment of the present disclosure.

FIG. 1A is a simplified schematic diagram illustrating an embodiment of an electronic device 10, in accordance with one embodiment of the present disclosure. Electronic device 10 may include a first housing 12a. First housing 12a can include supports 14a and 14b, a keyboard 16, a touchpad 18, and interconnects 46. Electrical device 10 may be an add-on accessory for a tablet. While electronic device 10 is illustrated as a keyboard add-on accessory, numerous other add-on accessories, substitutions, variations, alterations, and modifications may be used and it is intended that the present disclosure encompass all such other add-on accessories, substitutions, variations, alterations, and modifications as falling within the scope of the appended claims. For example, electronic device 10 may include one or more speakers, a second display, one large touchpad or drawing pad, etc.

Figure 1B:
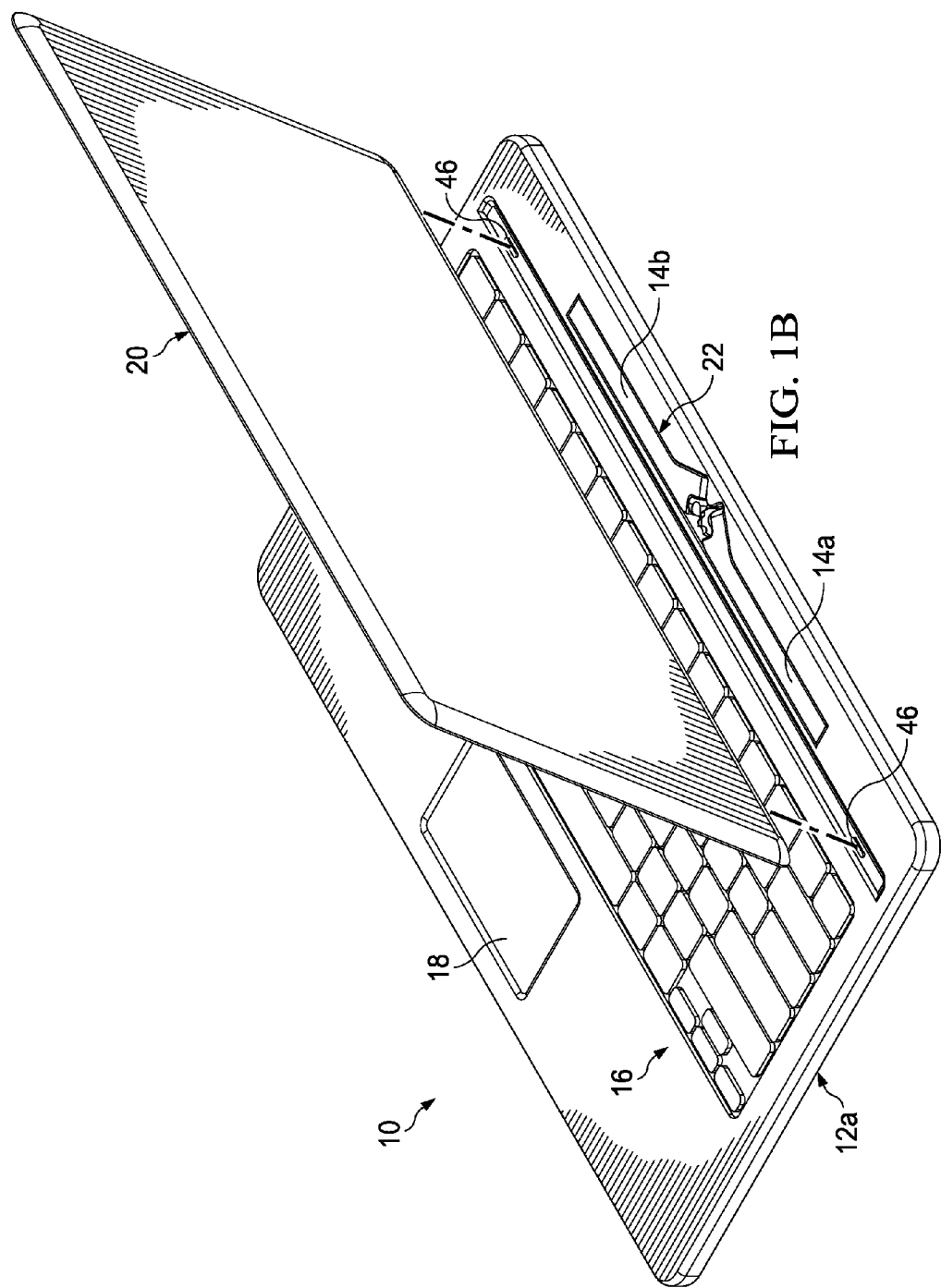
FIG. 1B is a simplified schematic diagram illustrating an orthographic view of an embodiment of an electronic device, in accordance with one embodiment of the present disclosure.

Turning to FIG. 1B, FIG. 1B is a simplified schematic diagram illustrating an embodiment of an electronic device 10, in accordance with one embodiment of the present disclosure. When a second housing 20 is brought down to first housing 12a, supports 14a and 14b can be raised to provide guidance and support for second housing 20. Supports 14a and 14b may each be stored or housed in a support channels 22 on the chassis of first housing 12a. Support channels 22 allows first housing 12a to have a relatively smooth profile and can be configured to recess each supports 14a and 14b when not in use.

Second housing 20 can be a tablet that includes a display. In one or more embodiments, the display can be a liquid crystal display (LCD) display screen, a light-emitting diode (LED) display screen, an organic light-emitting diode (OLED) display screen, a plasma display screen, or any other suitable display screen system. The display may be a touchscreen that can detect the presence and location of a touch within the display area. In another embodiment, second housing 20 may include a battery and various electronics (e.g., processor, memory, etc.) to allow second housing 20 to operate as a standalone tablet. In another embodiment, second housing 20 may include a wireless module (e.g., Wi-Fi module, Bluetooth module, etc.). In yet another embodiment, second housing 20 may include a camera, a microphone, and speakers.

Second housing 20 can be coupled to first housing 12a using interconnects 46. Interconnects 46 allow an electrical current and signals can be passed between first housing 12a and second housing 20 to recharge an on-board battery or capacitor, power any number of items (e.g., display, a wireless module, a camera, speakers, etc.), and provide a communication path between first housing 12a and second housing 20. In other examples, electrical current and signals can be passed through a plug-in connector (e.g., whose male side protrusion connects to first housing 12a and whose female side connects to second housing 20 or vice-versa) or a wireless connector (e.g., Wi-Fi, Bluetooth, etc.). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10. [Thunderbolt™ and the Thunderbolt logo are trademarks of Intel Corporation in the U.S. and/or other countries.]. Virtually any other electrical connection methods could be used and, thus, are clearly within the scope of the present disclosure.

Turning to FIG. 1C, FIG. 1C is a simplified schematic diagram illustrating an embodiment of an electronic device 10, in accordance with one embodiment of the present disclosure. As illustrated in FIG. 1C, second housing 20 has been coupled with first housing 12a. Supports 14a and 14b have been raised and can support second housing 20 to help stabilize electronic device 10 and help mitigate electronic device 10 tipping over.

Turning to FIG. 1D, FIG. 1D is a simplified schematic diagram illustrating an embodiment of an electronic device 10, in accordance with one embodiment of the present disclosure. FIG. 1D is a side view of electronic device 10 illustrated in FIG. 1C. In an example, as illustrated in FIGS. 1A-1D, supports 14a and 14b can be stored or housed within the thickness of first housing 12a (e.g., a typical keyboard base). When supports 14a and 14b are extended, they can be configured to mitigate against tipping and provide support for second housing 20 without incurring a significant thickness penalty.

The following detailed description sets forth example embodiments of apparatuses, methods, and systems relating to a support mechanism for an electronic device. Features such as structure(s), function(s), and/or characteristic(s), for example, are described with reference to one embodiment as a matter of convenience; various embodiments may be implemented with any suitable one or more of the described features. The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment many have different advantages, and no particular advantage is necessarily required of any embodiment.

Although the embodiments described are related to laptops, tablets, convertible laptops, hybrid laptops, etc. there may be other embodiments that deal with phone, PDAs, audio systems, etc. A hybrid laptop, (e.g., a convertible computer, etc.) is a mobile computer that can include a clamshell or laptop configuration and a tablet configuration. To convert from the clamshell configuration to the tablet configuration, often the display or screen (e,g, second housing 20) can be separated from a base or a keyboard (e.g., first housing 12a). While hybrid laptops are a compelling way of delivering convertibility from a clamshell configuration to a tablet configuration, in some designs, when the device is in an open clamshell configuration, the device is top heavy. This is because once detached, the display is a fully functioning tablet which necessitates that most of the electronics are in the display, leaving little system mass under the base. The fact that the device is top heavy makes the device susceptible to tip over while in an open clamshell configuration and many devices today are extremely unstable when using touchscreen functions, especially when using the device on an uneven surface such as a lap of a user. To remedy the problem of tipping, some devices have a larger base than the display. Unfortunately, this can make hybrid laptops undesirable to some users when the hybrid laptop is in a closed clamshell configuration as the base sticks out from an edge or edges of the display.

In an embodiment, an electrical device can be configured to mitigate against tipping by provisioning a first housing with sufficient support for use with a second housing, without incurring a significant thickness penalty. In an example, supports (e.g., supports 14a and 14b) may be linked via co-meshing teeth that are hinged around a canted hinge axes such that in a retracted position, the supports occupy a narrow strip (e.g., support channels 22) behind the docking interface (e.g., interconnects 46), but when deployed, the supports can support the tablet at a desired angle. The supports may be tension or spring loaded and deployed by pressing a latch or button or a proximity sensor can trigger the release of the supports.

Figure 2A:
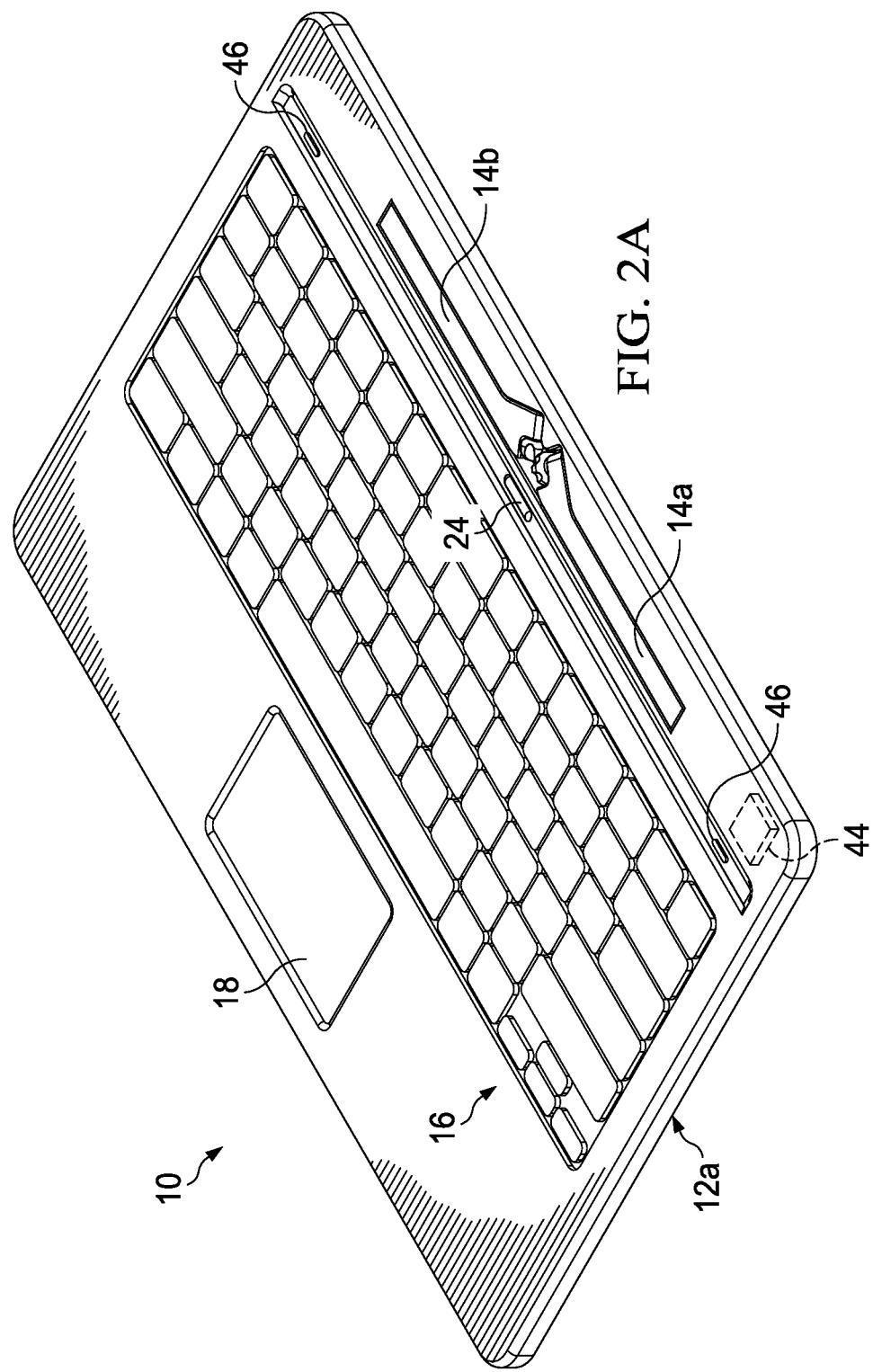
FIG. 2A is a simplified schematic diagram illustrating an orthographic view of an electronic device, in accordance with one embodiment of the present disclosure.

Turning to FIG. 2A, FIG. 2A is a simplified schematic diagram illustrating an embodiment of an electronic device 10, in accordance with one embodiment of the present disclosure. First housing 12a can include supports 14a and 14b, keyboard 16, touchpad 18, an electrical release 24 (e.g., a proximity sensor), and a processor 44. Upon the activation of electrical release 24, supports 14a and 14b may be released. Processor 44 can be configured to use electrical release 24 to determine when second housing 20 is close to first housing 12a and then to release supports 14a and 14b or when to otherwise trigger the release of supports 14a and 14b (e.g., electrical release 24 may be an electronic push button release).

Figure 2B:
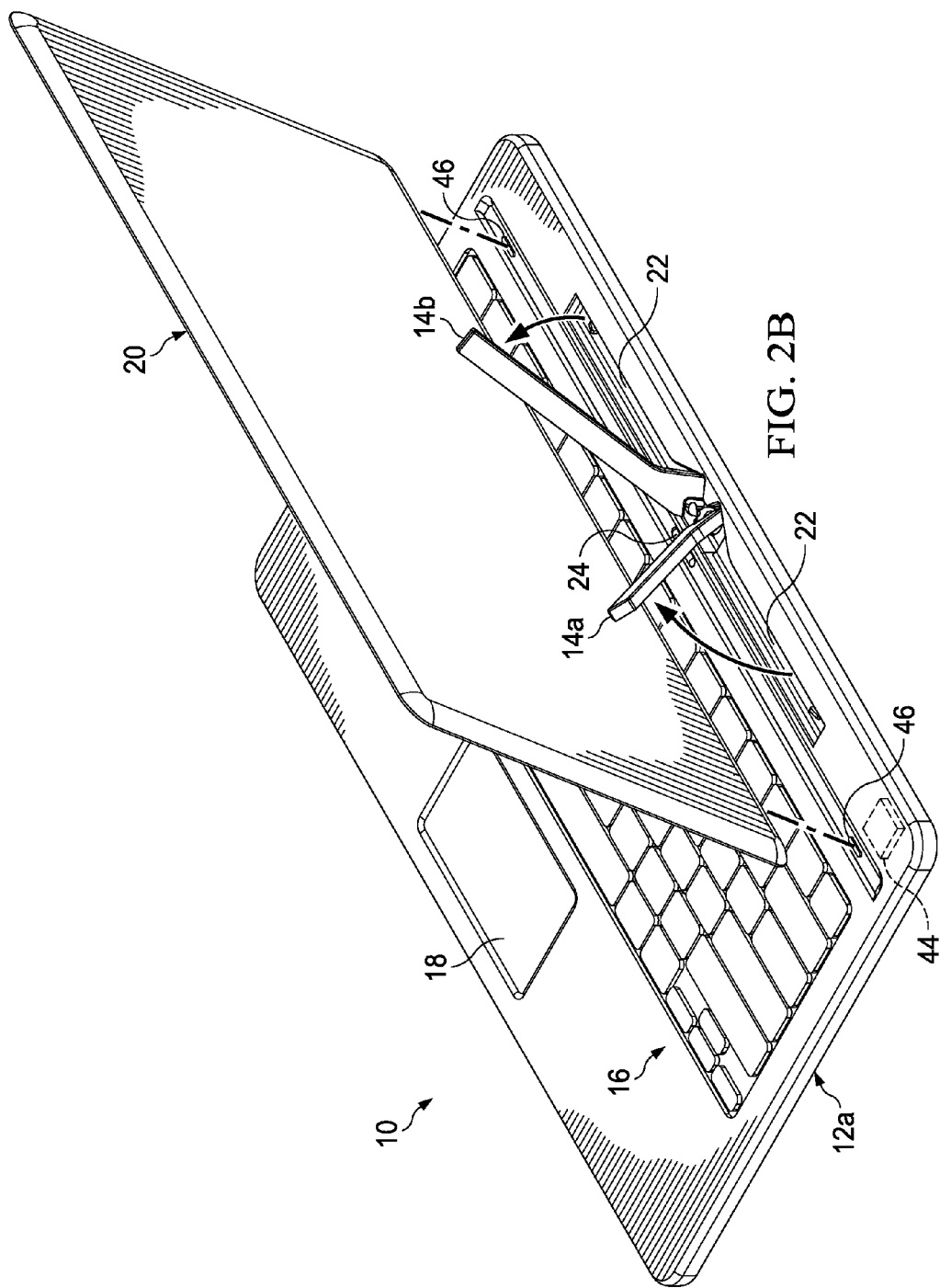
FIG. 2B is a simplified schematic diagram illustrating an orthographic view of an electronic device, in accordance with one embodiment of the present disclosure.

Turning to FIG. 2B, FIG. 2B is a simplified schematic diagram illustrating an embodiment of an electronic device 10, in accordance with one embodiment of the present disclosure. As illustrated in FIG. 2B, second housing 20 is close to first housing 12a. Electrical release 24 can detect the presence of second housing 20 and send a signal to processor 44 to release supports 14a and 14b.

Processor 44 may be located on a motherboard. Any processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

Figure 3A:
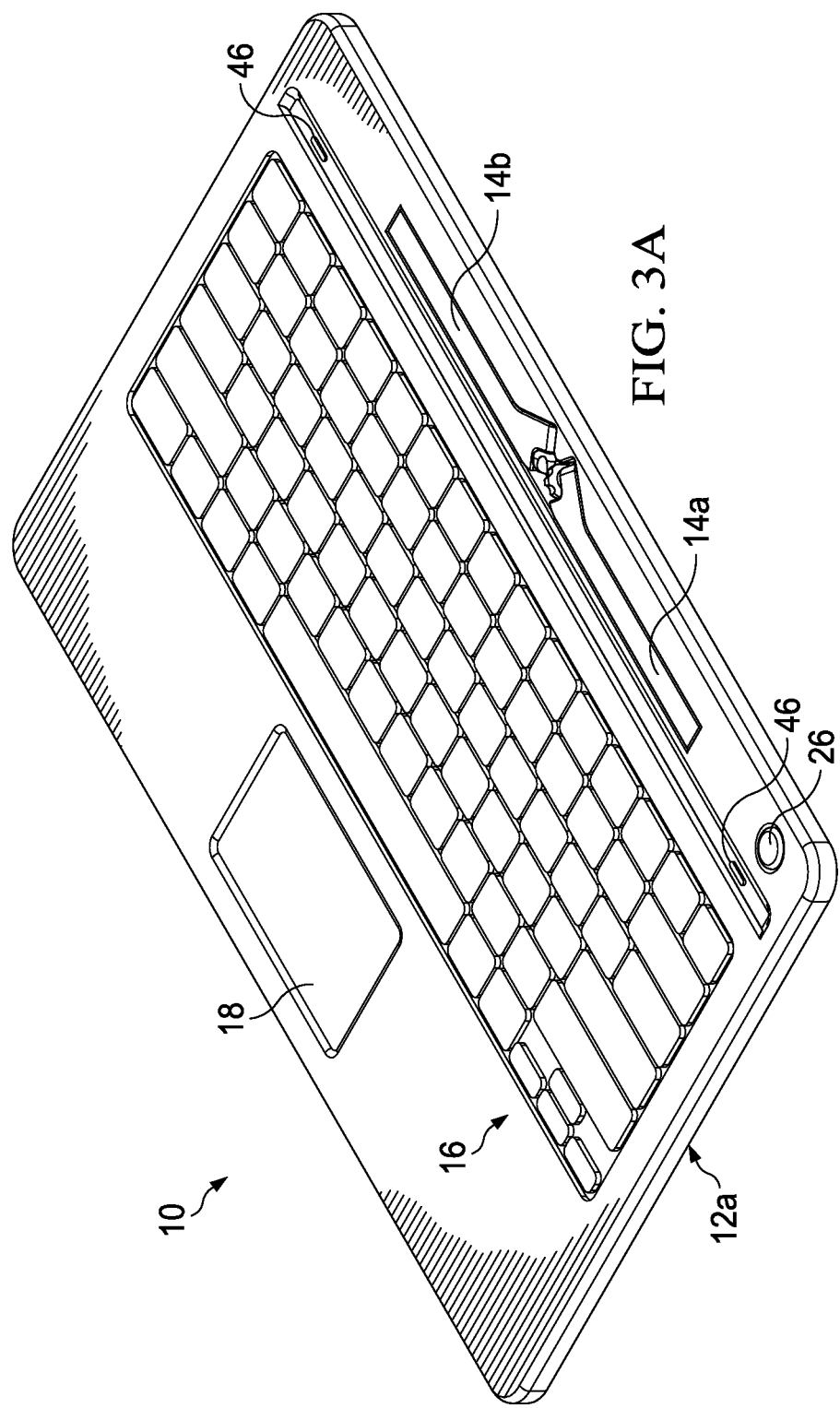
FIG. 3A is a simplified schematic diagram illustrating an orthographic view of an electronic device, in accordance with one embodiment of the present disclosure.
Figure 3B:
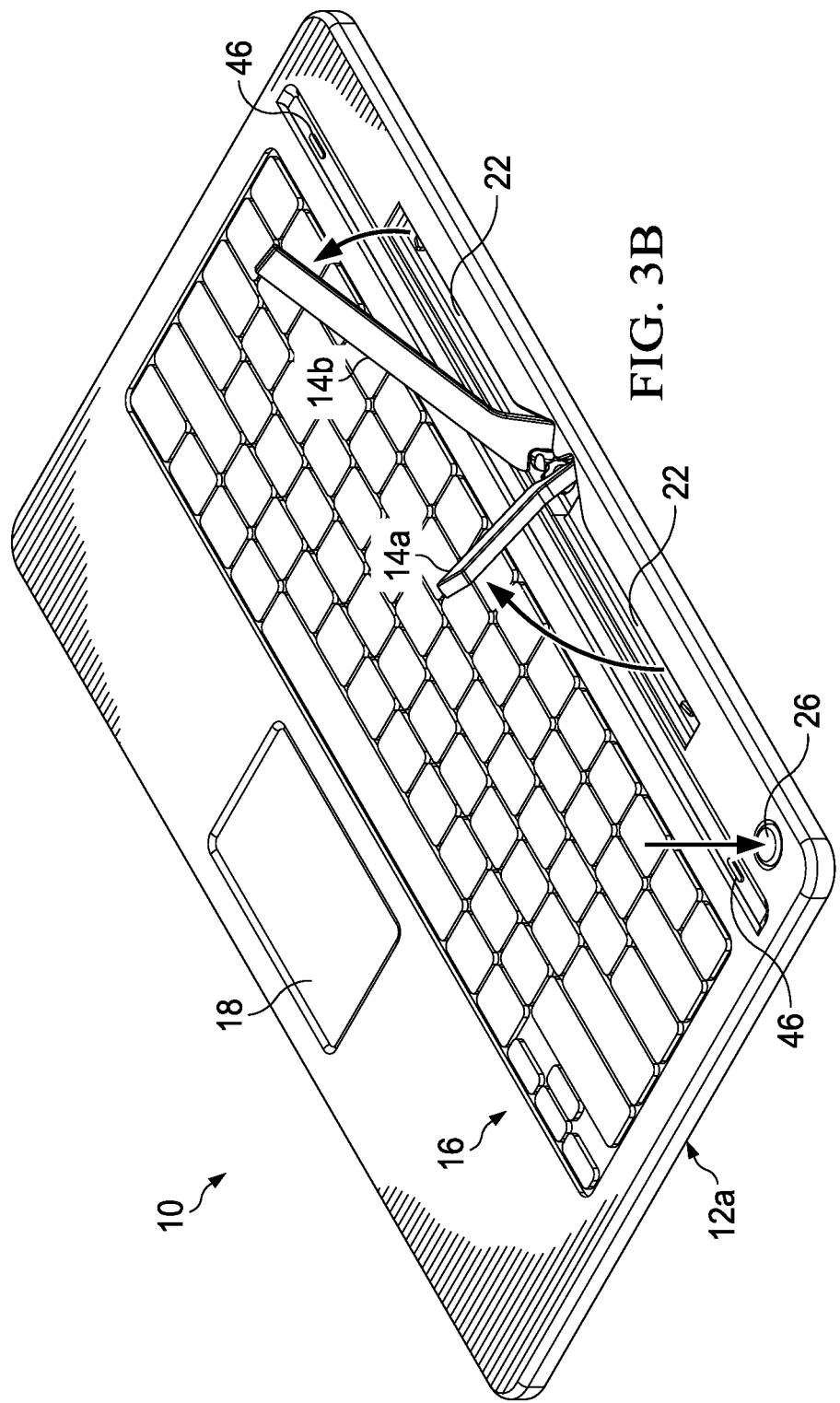
FIG. 3B is a simplified schematic diagram illustrating an orthographic view of an electronic device, in accordance with one embodiment of the present disclosure.

Turning to FIG. 3A, FIG. 3A is a simplified schematic diagram illustrating an embodiment of an electronic device 10, in accordance with one embodiment of the present disclosure. First housing 12a can include supports 14a and 14b, keyboard 16, touchpad 18, and a mechanical release 26 (e.g., a push button or a slide release). Upon the activation of mechanical release 26, supports 14a and 14b may be released. Turning to FIG. 3B, FIG. 3B is a simplified schematic diagram illustrating an embodiment of an electronic device 10, in accordance with one embodiment of the present disclosure. As illustrated in FIG. 3B, mechanical release 26 has been activated, thus causing supports 14a and 14b to be raised.

Figure 4A:
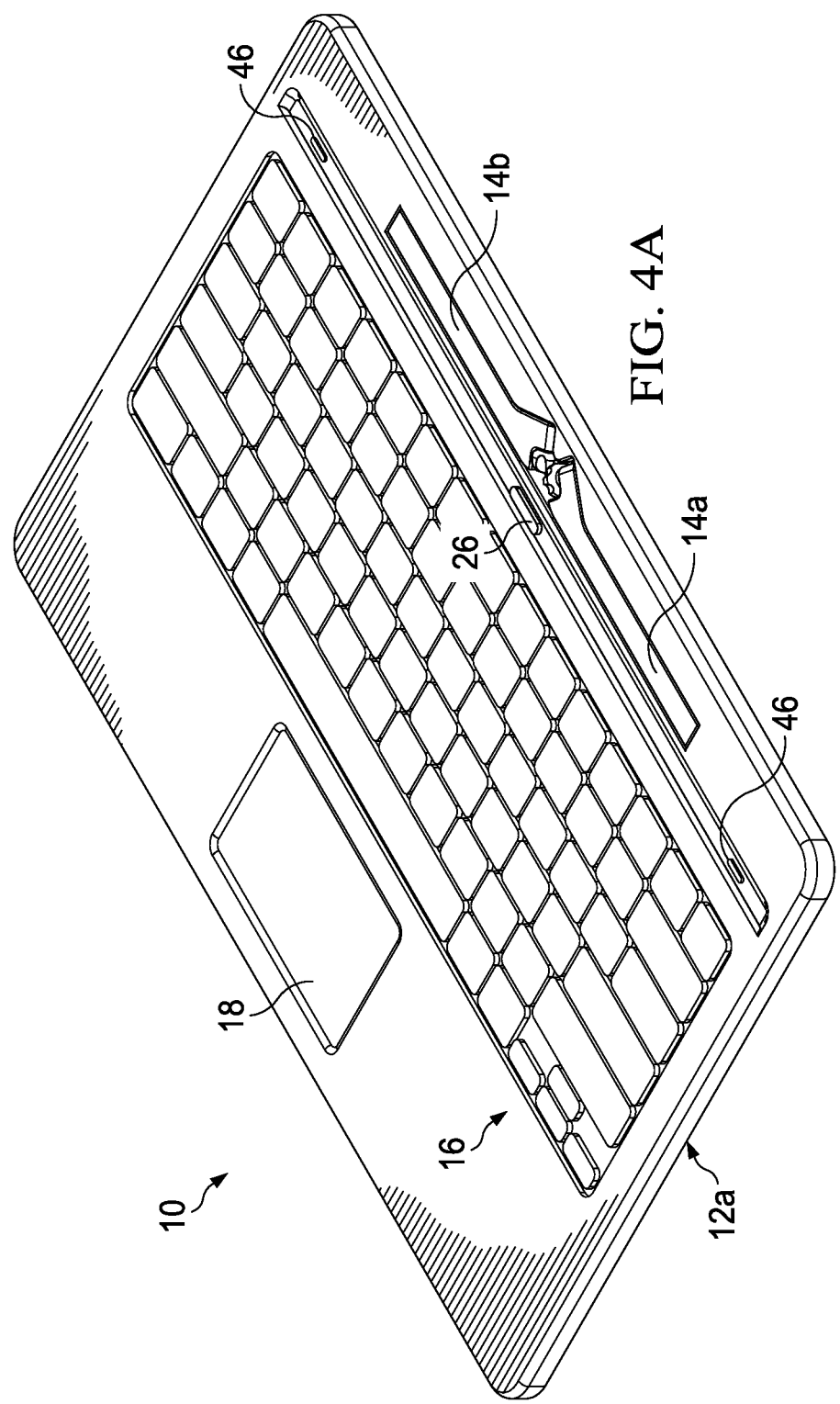
FIG. 4A is a simplified schematic diagram illustrating an orthographic view of an electronic device, in accordance with one embodiment of the present disclosure.

Turning to FIG. 4A, FIG. 4A is a simplified schematic diagram illustrating an embodiment of an electronic device 10, in accordance with one embodiment of the present disclosure. As illustrated in FIG. 4A, mechanical release 26 can be located in the proximate area of where second housing 20 may come into contact with first housing 12a. When second housing 20 comes into contact with mechanical release 26, mechanical release may be activated and supports 14a and 14b may be released.

Figure 4B:
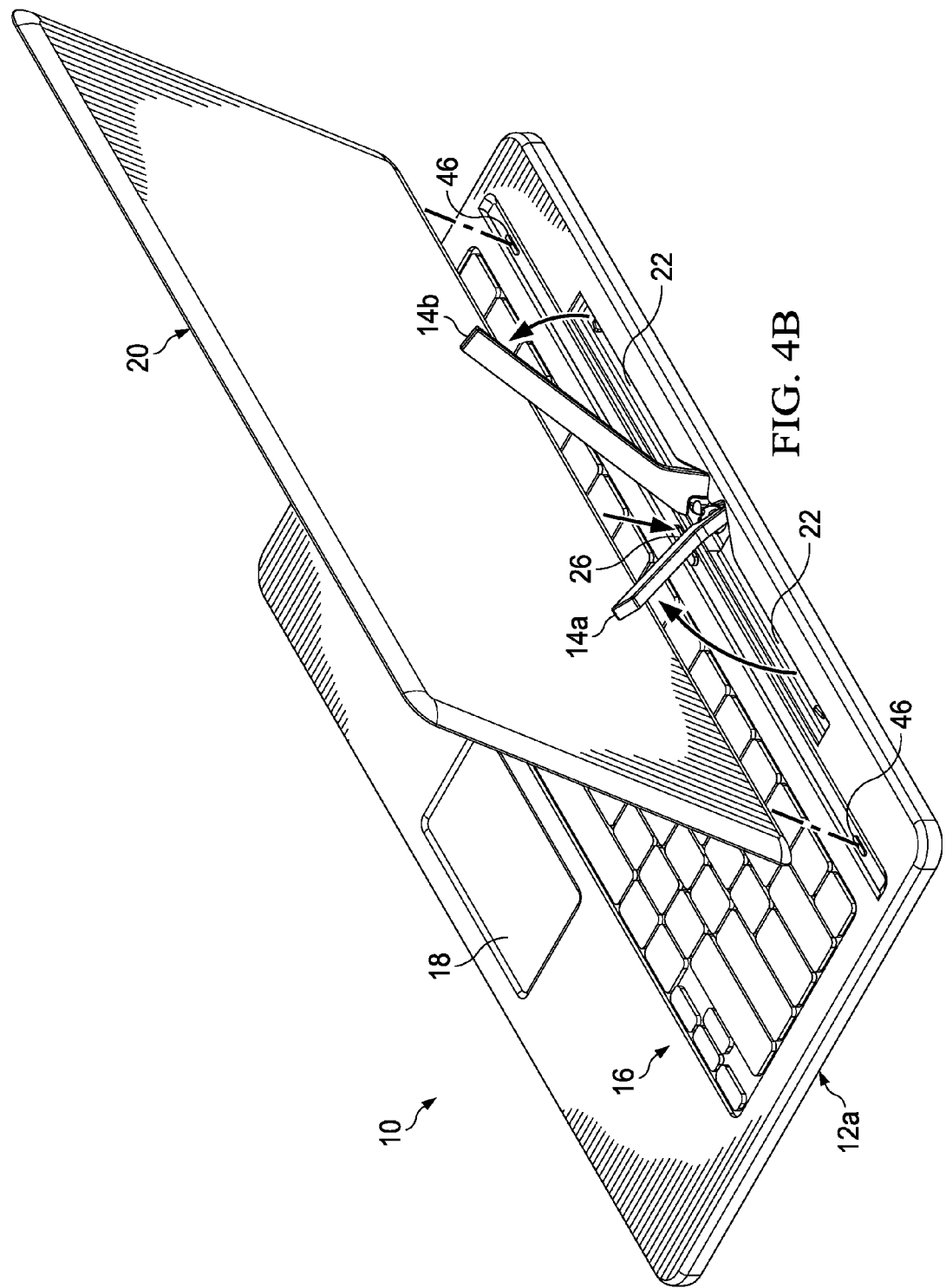
FIG. 4B is a simplified schematic diagram illustrating an orthographic view of an electronic device, in accordance with one embodiment of the present disclosure.

Turning to FIG. 4B, FIG. 4B is a simplified schematic diagram illustrating an embodiment of an electronic device 10, in accordance with one embodiment of the present disclosure. As illustrated in FIG. 4B, second housing 20 is illustrated as coming into contact with mechanical release 26 on first housing 12. This causes mechanical release 26 to be activated and supports 14a and 14b to be raised.

Figure 5A:
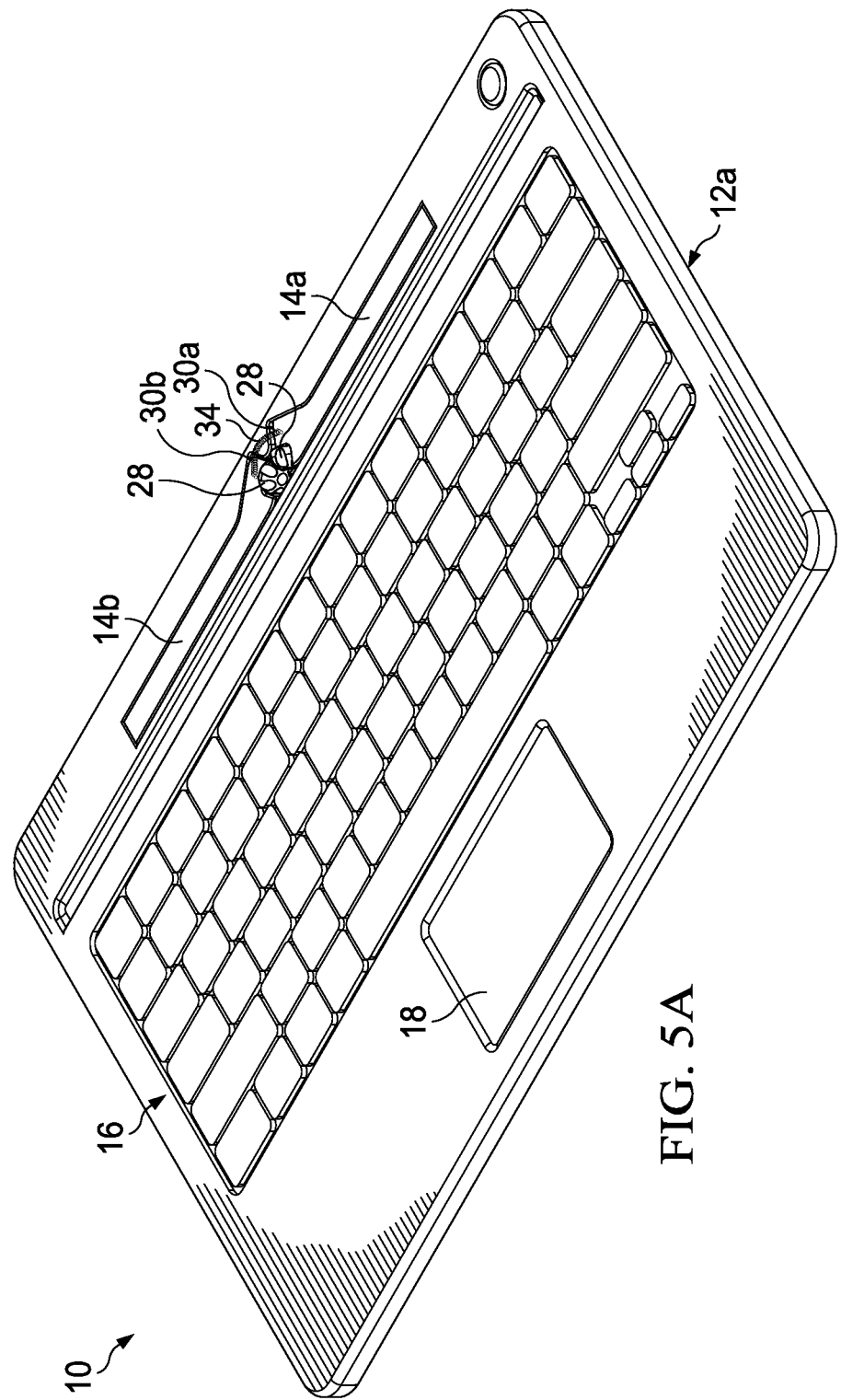
FIG. 5A is a simplified schematic diagram illustrating an orthographic view of an electronic device, in accordance with one embodiment of the present disclosure.

Turning to FIG. 5A, FIG. 5A is a simplified schematic diagram illustrating an embodiment of a portion of an electronic device 10, in accordance with one embodiment of the present disclosure. Supports 14a and 14b can be rotatably coupled to bevel gears 28. Bevel gears 28 can be configured to allow supports 14a and 14b to rotate about symmetrical but canted axes. Using bevel gears 28 and support channels 22, supports 14a and 14b can lie retracted within the thickness of first housing 12a. Then, when a release (e.g., electrical release 24 or mechanical release 26) is activated, tension mechanism 34 (e.g., a spring) can pull supports 14a and 14b together. Support 14a and 14b can each have an angled profile 30a and 30b proximate to beveled gears 28

Figure 5B:
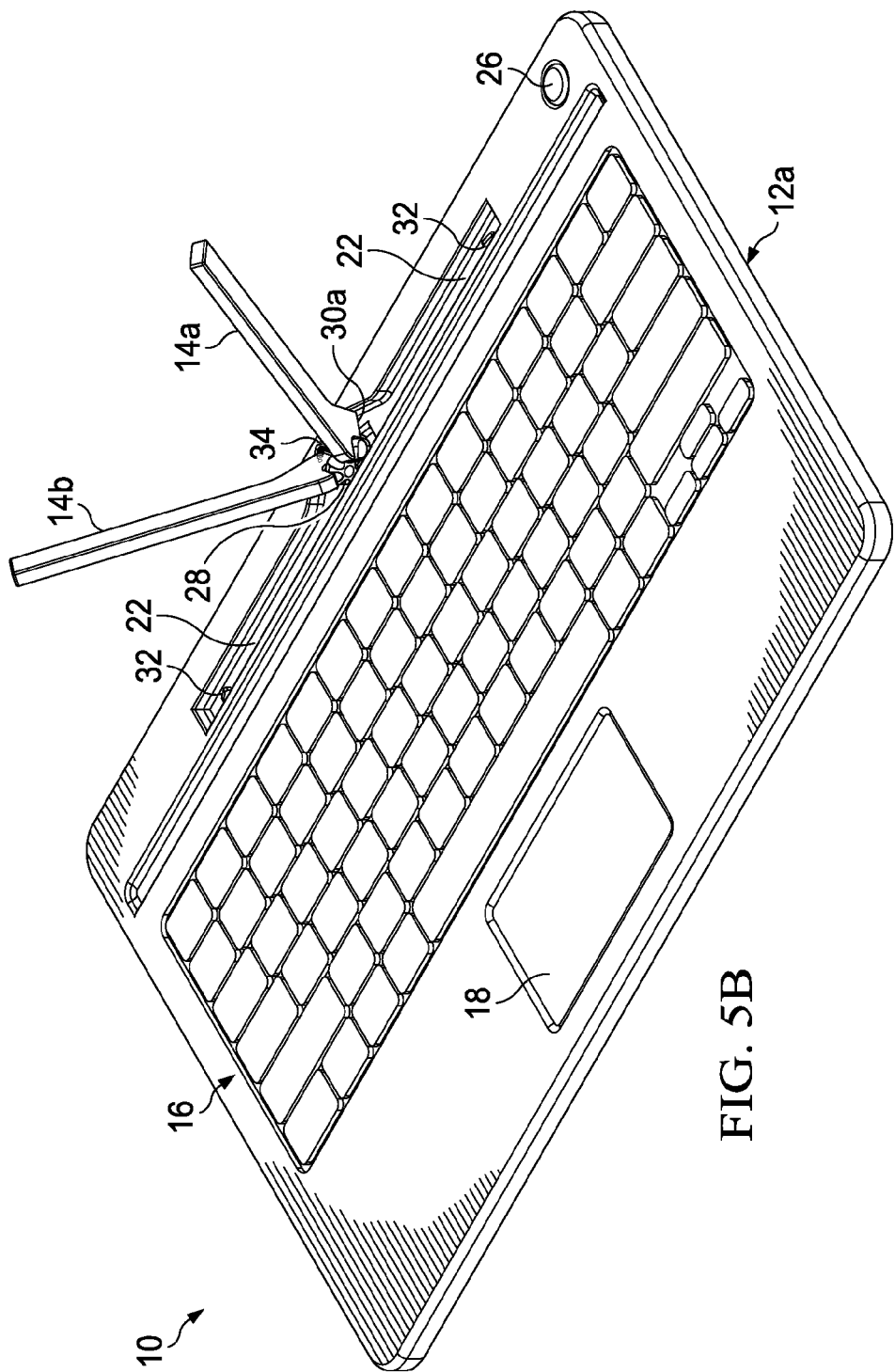
FIG. 5B is a simplified schematic diagram illustrating an orthographic view of an electronic device, in accordance with one embodiment of the present disclosure.

Turning to FIG. 5B, FIG. 5B is a simplified schematic diagram illustrating an embodiment of a portion of an electronic device 10, in accordance with one embodiment of the present disclosure. As illustrated in FIG. 5B, a 'V' configuration that supports second housing 20 can be created using bevel gears 28. Bevel gears 28 can be meshed together with integrated gear teeth. Support 14a and 14b can each have an angled profile 30a and 30b respectively to help facilitate the 'V' configuration. The nature of the angled or canted bevel gears 28 and the angled profile 30a and 30b, means that when deployed, the tips of supports 14a and 14b swing through an arc that positions them some distance back from their stowed position, thus allowing second housing 20 to be coupled to first housing 12a at an ergonomic angle.

A securing mechanism 32 can retain supports 14a and 14b in support channels 22 until the activation of mechanical release 26 (or electrical release 24). In an example, each support secure mechanism may be a mechanical securing mechanism such as a hook that couples with supports 14a and 14b and can secure each support 14a and 14b in support channels 22. In another example, each support secure mechanism may be a magnetic type securing mechanism that can secure each support 14a and 14b in support channels 22.

Figure 6A:
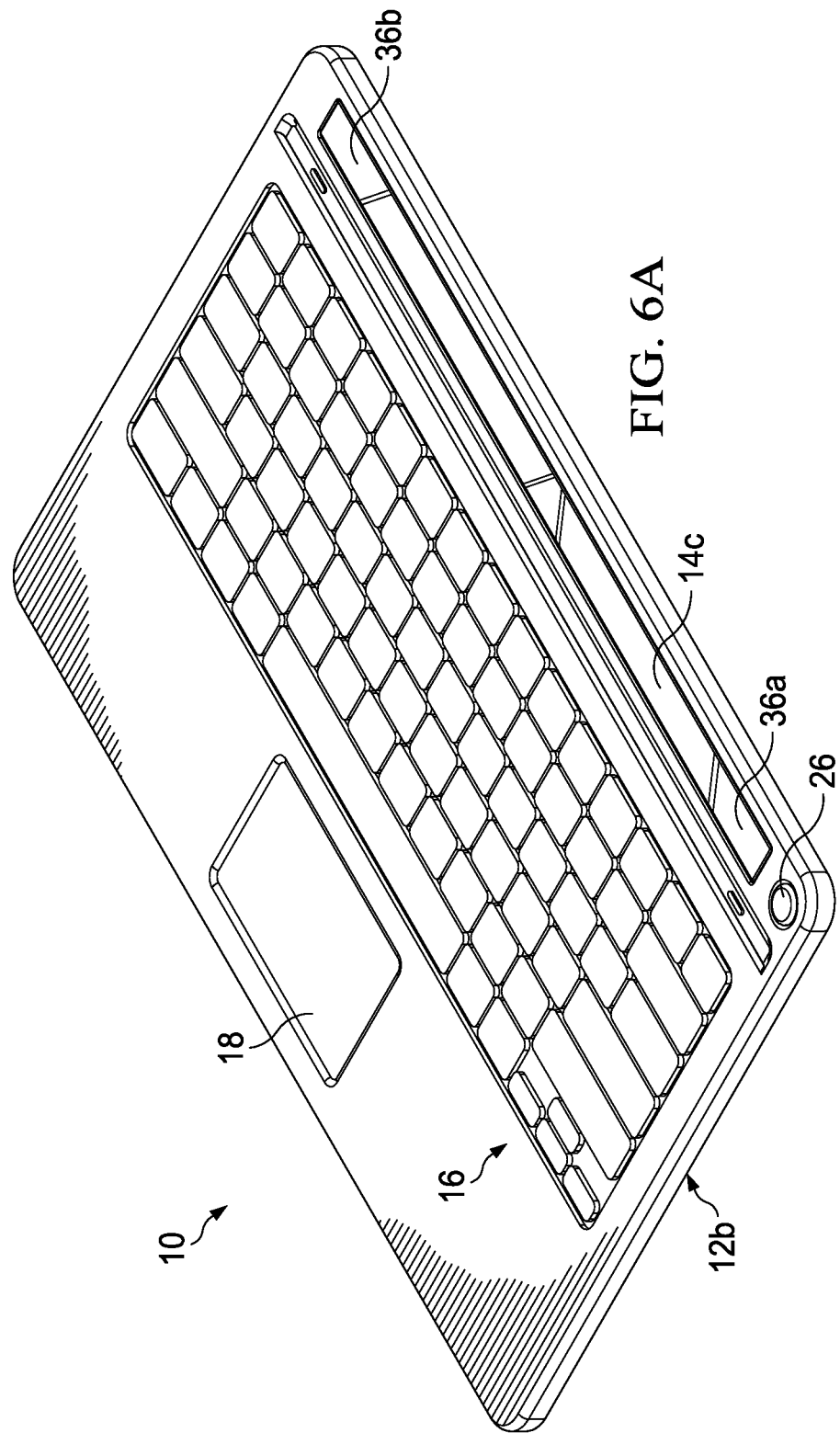
FIG. 6A is a simplified schematic diagram illustrating an orthographic view of an electronic device, in accordance with one embodiment of the present disclosure.

Turning to FIG. 6A, FIG. 6A is a simplified schematic diagram illustrating an embodiment of an electronic device 10, in accordance with one embodiment of the present disclosure. First housing 12b can include a support 14c. Support 14c can include sliding ends 36a and 36b, located on opposite sides of support 14c.

Figure 6B:
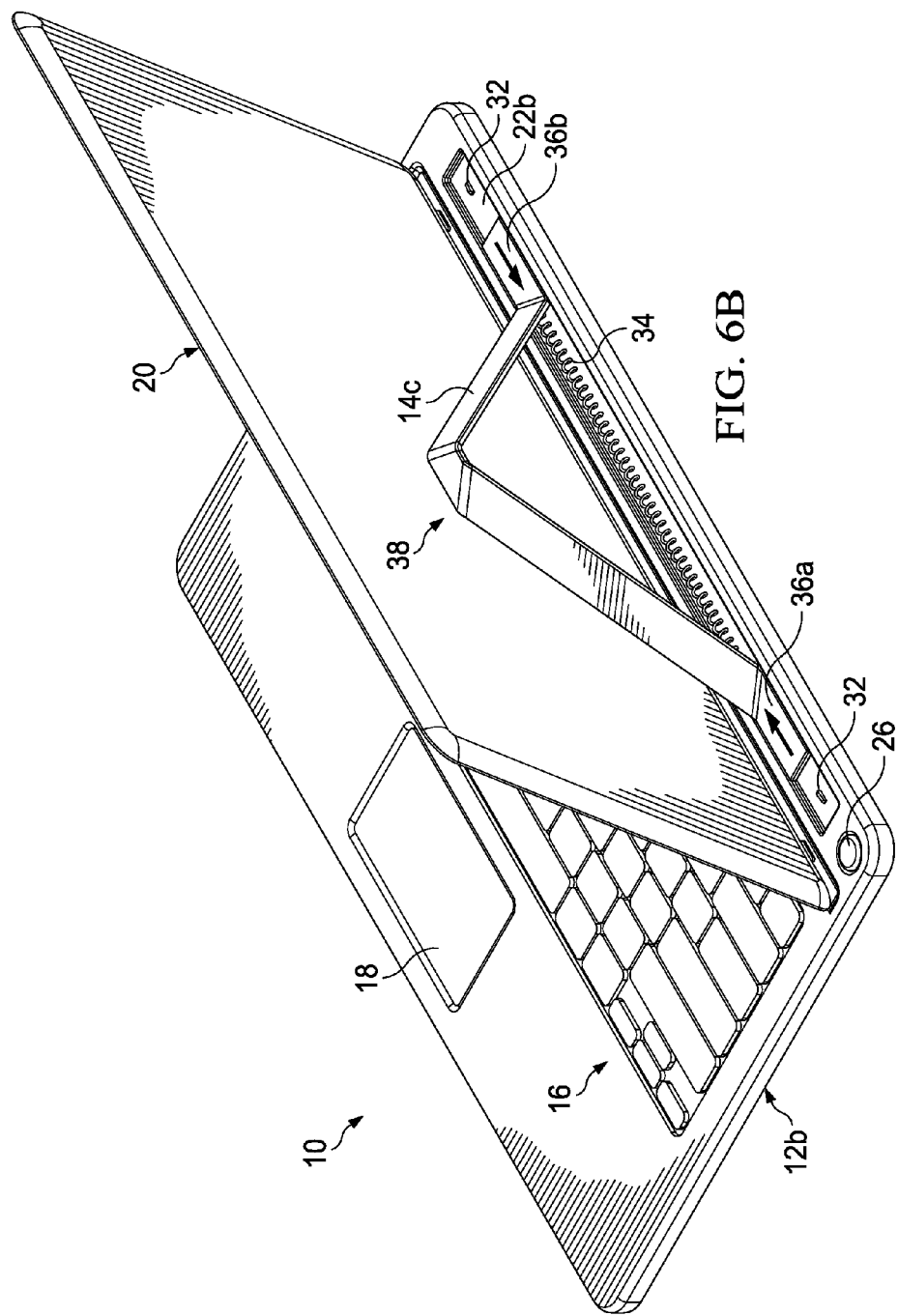
FIG. 6B is a simplified schematic diagram illustrating an orthographic view of an electronic device, in accordance with one embodiment of the present disclosure.

Turning to FIG. 6B, FIG. 6B is a simplified schematic diagram illustrating an embodiment of an electronic device 10, in accordance with one embodiment of the present disclosure. When mechanical release 26 (or electrical release 24 if present) is activated, securing mechanism 32 releases sliding ends 36a and 36b leaving them free to move along support channel 22b. Tension mechanism 34 can pull sliding ends 36a and 36b towards each other. As sliding ends 36a and 36b move towards each other along support channel 22b, support 14c can bend or deform at a preformed deformation area 38. Preformed deformation area 38 allows support 14c to naturally form a second housing support profile (e.g., an "A" profile) when sliding ends 36a and 36b move towards each other along support channel 22b. The created second housing support profile can be used to support second housing 20 as illustrated in FIG. 6B.

Figure 7A:
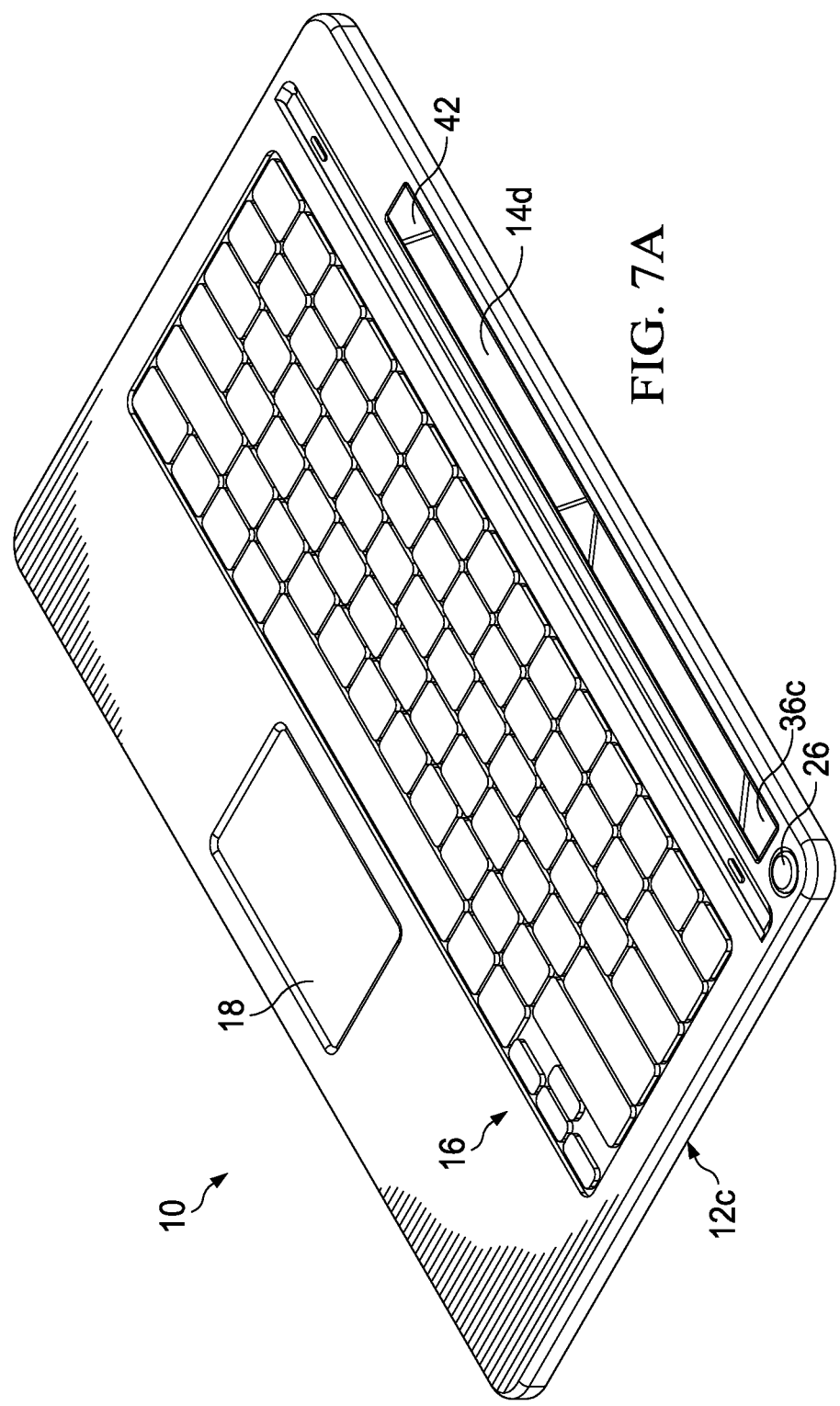
FIG. 7A is a simplified schematic diagram illustrating an orthographic view of an electronic device, in accordance with one embodiment of the present disclosure.

Turning to FIG. 7A, FIG. 7A is a simplified schematic diagram illustrating an embodiment of an electronic device 10, in accordance with one embodiment of the present disclosure. First housing 12c can include a support 14d. Support 14d can include a sliding end 36c located on one side of support 14d and a stationary end 42 located on an opposite side of support 14c.

Turning to FIG. 7B, FIG. 7B is a simplified schematic diagram illustrating an embodiment of an electronic device 10, in accordance with one embodiment of the present disclosure. When mechanical release 26 (or electrical release 24 if present) is activated, securing mechanism 32 releases sliding end 36c leaving it free to move along support channel 22b. Tension mechanism 34 can pull sliding end 36c towards stationary end 42. As sliding end 36c moves towards stationary end 42, support 14d can bend or deform at a preformed deformation area 38. Preformed deformation area 38 allows support 14d to naturally form a second housing support profile (e.g., an "A" profile) when sliding end 36c moves towards stationary end 42 along support channel 22b. The created second housing support profile can be used to support second housing 20 as illustrated in FIG. 7B.

Turning to FIG. 8, FIG. 8 is a simplified block diagram associated with an example ARM ecosystem SOC 800 of the present disclosure. At least one example implementation of the present disclosure can include the retractable support mechanism features discussed herein and an ARM component. For example, the example of FIG. 8 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more example embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
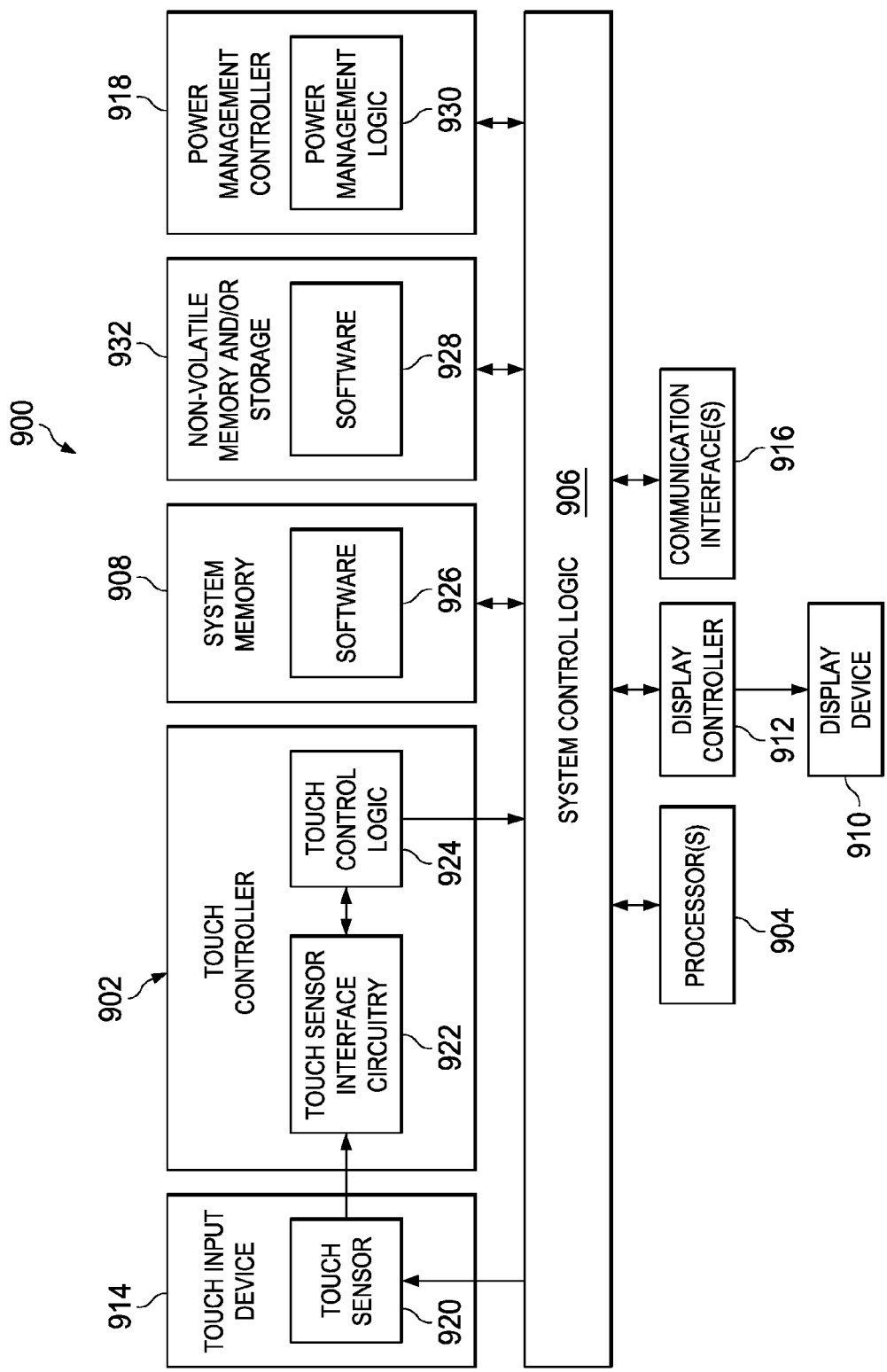
FIG. 9 is a simplified block diagram illustrating example logic that may be used to execute activities associated with the present disclosure.

Turning to FIG. 9, FIG. 9 is a simplified block diagram illustrating potential electronics and logic that may be associated with any of the electronic devices discussed herein. In at least one example embodiment, system 900 can include a touch controller 902, one or more processors 904, system control logic 906 coupled to at least one of processor(s) 904, system memory 908 coupled to system control logic 906, non-volatile memory and/or storage device(s) 932 coupled to system control logic 906, display controller 912 coupled to system control logic 906, display controller 912 coupled to a display device 910, power management controller 918 coupled to system control logic 906, and/or communication interfaces 916 coupled to system control logic 906.

System control logic 906, in at least one embodiment, can include any suitable interface controllers to provide for any suitable interface to at least one processor 904 and/or to any suitable device or component in communication with system control logic 906. System control logic 906, in at least one example embodiment, can include one or more memory controllers to provide an interface to system memory 908. System memory 908 may be used to load and store data and/or instructions, for example, for system 900. System memory 908, in at least one example embodiment, can include any suitable volatile memory, such as suitable dynamic random access memory (DRAM) for example. System control logic 906, in at least one example embodiment, can include one or more I/O controllers to provide an interface to display device 910, touch controller 902, and non-volatile memory and/or storage device(s) 932.

Non-volatile memory and/or storage device(s) 932 may be used to store data and/or instructions, for example within software 928. Non-volatile memory and/or storage device(s) 932 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 918 may include power management logic 930 configured to control various power management and/or power saving functions disclosed herein or any part thereof. In at least one example embodiment, power management controller 918 is configured to reduce the power consumption of components or devices of system 900 that may either be operated at reduced power or turned off when the electronic device is in a closed configuration. For example, in at least one example embodiment, when the electronic device is in a closed configuration, power management controller 918 performs one or more of the following: power down the unused portion of the display and/or any backlight associated therewith; allow one or more of processor(s) 904 to go to a lower power state if less computing power is required in the closed configuration; and shutdown any devices and/or components that are unused when an electronic device is in the closed configuration.

Communications interface(s) 916 may provide an interface for system 900 to communicate over one or more networks and/or with any other suitable device. Communications interface(s) 916 may include any suitable hardware and/or firmware. Communications interface(s) 916, in at least one example embodiment, may include, for example, a network adapter, a wireless network adapter, a telephone modem, and/or a wireless modem.

System control logic 906, in at least one example embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 904 may be packaged together with logic for one or more controllers of system control logic 906. In at least one example embodiment, at least one processor 904 may be packaged together with logic for one or more controllers of system control logic 906 to form a System in Package (SiP). In at least one example embodiment, at least one processor 904 may be integrated on the same die with logic for one or more controllers of system control logic 906. For at least one example embodiment, at least one processor 904 may be integrated on the same die with logic for one or more controllers of system control logic 906 to form a System on Chip (SoC).

For touch control, touch controller 902 may include touch sensor interface circuitry 922 and touch control logic 924. Touch sensor interface circuitry 922 may be coupled to detect touch input over a first touch surface layer and a second touch surface layer of a display (i.e., display device 910). Touch sensor interface circuitry 922 may include any suitable circuitry that may depend, for example, at least in part on the touch-sensitive technology used for a touch input device. Touch sensor interface circuitry 922, in one embodiment, may support any suitable multi-touch technology. Touch sensor interface circuitry 922, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 924 may be coupled to help control touch sensor interface circuitry 922 in any suitable manner to detect touch input over a first touch surface layer and a second touch surface layer. Touch control logic 924 for at least one example embodiment may also be coupled to output in any suitable manner digital touch input data corresponding to touch input detected by touch sensor interface circuitry 922. Touch control logic 924 may be implemented using any suitable logic, including any suitable hardware, firmware, and/or software logic (e.g., non-transitory tangible media), that may depend, for example, at least in part on the circuitry used for touch sensor interface circuitry 922. Touch control logic 924 for at least one embodiment may support any suitable multi-touch technology.

Touch control logic 924 may be coupled to output digital touch input data to system control logic 906 and/or at least one processor 904 for processing. At least one processor 904 for at least one embodiment may execute any suitable software to process digital touch input data output from touch control logic 924. Suitable software may include, for example, any suitable driver software and/or any suitable application software. As illustrated in FIG. 9, system memory 908 may store suitable software 926 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., configuration, number, location, height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is an electronic device that includes a first housing. The first housing includes a retractable second housing support. The second housing support includes a stored configuration and a second housing support configuration. The second housing configuration is configured to support a second housing. The first housing also includes a release that is configured to release the second housing support from the stored configuration.

In Example A2, the subject matter of Example A1 may optionally include a tension mechanism that pulls the second housing support into the second housing support configuration when the release is activated.

In Example A3, the subject matter of any of the preceding 'A' Examples can optionally include where the release is an electrical release.

In Example A4, the subject matter of any of the preceding 'A' Examples can optionally include where the release is a proximity sensor.

In Example A5, the subject matter of any of the preceding 'A' Examples can optionally include where the release is a mechanical release.

In Example A6, the subject matter of any of the preceding 'A' Examples can optionally include where the release is activated when the second housing comes into contact with the mechanical release.

In Example A7, the subject matter of any of the preceding 'A' Examples can optionally include where the second housing support is housed in the body of the first housing such that the first housing has a relatively smooth profile.

In Example A8, the subject matter of any of the preceding 'A' Examples can optionally include where the second housing support includes two supports and the two supports transition from the stored configuration to the second housing support configuration on bevel gears that rotate about symmetrical canted axes.

In Example A9, the subject matter of any of the preceding 'A' Examples can optionally include where the second housing support includes opposite sliding ends.

In Example A10, the subject matter of any of the preceding 'A' Examples can optionally include where the opposite ends are pulled towards each other by a tension mechanism and a preformed deformation area allows the second housing support to transition into the second housing support configuration when the release is activated.

In Example A11, the subject matter of any of the preceding 'A' Examples can optionally include where the second housing support includes one sliding end and one secured end.

In Example A12, the subject matter of any of the preceding 'A' Examples can optionally include where the sliding end is pulled towards the secured end by a tension mechanism and a preformed deformation area allows the second housing support to transition into the second housing support configuration when the release is activated.

Example M1 is a method that includes activating a release on a first housing, where the first housing includes a retractable second housing support, where the second housing support includes a stored configuration and a second housing support configuration, where the second housing configuration is configured to support a second housing and transitioning of the second housing support from the stored configuration to the second housing support configuration in response to the activation of the release.

In Example M2, the subject matter of any of the preceding 'M' Examples can optionally include where upon activation of the release, a tension mechanism pulls the second housing support into the second housing support configuration.

In Example M3, the subject matter of any of the preceding 'M' Examples can optionally include where the release is an electrical release.

In Example M4, the subject matter of any of the preceding 'M' Examples can optionally include where the release is a proximity sensor.

In Example M5, the subject matter of any of the preceding 'M' Examples can optionally include where the release is a mechanical release.

In Example M6, the subject matter of any of the preceding 'M' Examples can optionally include where the second housing support includes two supports and the two supports transition from the stored configuration to the second housing support configuration on bevel gears that rotate about symmetrical canted axes.

In Example M7, the subject matter of any of the preceding 'M' Examples can optionally include where the second housing support includes opposite sliding ends and the opposite ends are pulled towards each other by a tension mechanism and a preformed deformation area allows the second housing support to transition into the second housing support configuration when the release is activated.

In Example M8, the subject matter of any of the preceding 'M' Examples can optionally include where the second housing support includes one sliding end and one secured end and the sliding end is pulled towards the secured end by a tension mechanism and a preformed deformation area allows the second housing support to transition into the second housing support configuration when the release is activated.

An example system S1 can include a second housing support, where the second housing support includes a stored configuration and a second housing support configuration, where in the stored configuration, the second housing support is retracted into a first housing and in the second housing support configuration, the second housing configuration is configured to support a second housing.

In Example S2, the subject matter of any of the preceding 'S' Examples can optionally include where a tension mechanism pulls the support into the second housing support configuration when a release is activated.

In Example S3, the subject matter of any of the preceding 'S' Examples can optionally include where the second housing support includes two supports and the two supports transition from the stored configuration to the second housing support configuration on bevel gears that rotate about symmetrical canted axes.

In Example S4, the subject matter of any of the preceding 'S' Examples can optionally include where the second housing support includes opposite sliding ends and the opposite ends are pulled towards each other by a tension mechanism and a preformed deformation area allows the second housing support to transition into the second housing support configuration when a release is activated.

In Example S5, the subject matter of any of the preceding 'S' Examples can optionally include where the second housing support includes one sliding end and one secured end and the sliding end is pulled towards the secured end by a tension mechanism and a preformed deformation area allows the second housing support to transition into the second housing support configuration when a release is activated.

Example X1 is a machine-readable storage medium including machine-readable instructions to implement a method or realize an apparatus as in any one of the Examples A1-A12 and M1-M8. Example Y1 is an apparatus comprising means for performing of any of the Example methods M1-M8. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
   a first housing, wherein the first housing includes:
      a retractable second housing support, wherein the second housing support includes a stored configuration and a second housing support configuration, wherein the second housing configuration is configured to support a second housing; and
      a release that is configured to release the second housing support from the stored configuration, wherein the release is an electrical release.

2. The electronic device of claim 1, wherein the first housing further includes:
   a tension mechanism that pulls the second housing support into the second housing support configuration when the release is activated.

3. The electronic device of claim 1, wherein the release is a proximity sensor.

4. The electronic device of claim 1, wherein the release is also a mechanical release.

5. The electronic device of claim 4, wherein the release is activated when the second housing comes into contact with the mechanical release.

6. The electronic device of claim 1, wherein the second housing support is housed in a body of the first housing such that the first housing has a relatively smooth profile.

7. The electronic device of claim 1, wherein the second housing support includes two supports and the two supports transition from the stored configuration to the second housing support configuration on bevel gears that rotate about symmetrical canted axes.

8. The electronic device of claim 1, wherein the second housing support includes opposite sliding ends.

9. The electronic device of claim 8, wherein the opposite ends are pulled towards each other by a tension mechanism and a preformed deformation area allows the second housing support to transition into the second housing support configuration when the release is activated.

10. The electronic device of claim 1, wherein the second housing support includes one sliding end and one secured end.

11. The electronic device of claim 1, wherein a sliding end is pulled towards the secured end by a tension mechanism and a preformed deformation area allows the second housing support to transition into the second housing support configuration when the release is activated.

12. A method, comprising:
    activating a release on a first housing, wherein the first housing includes a retractable second housing support, wherein the second housing support includes a stored configuration and a second housing support configuration, wherein the second housing configuration is configured to support a second housing; and
    transitioning of the second housing support from the stored configuration to the second housing support configuration in response to the activation of the release, wherein the release is an electrical release.

13. The method of claim 12, wherein upon activation of the release, a tension mechanism pulls the second housing support into the second housing support configuration.

14. The method of claim 12, wherein the release is a proximity sensor.

15. The method of claim 12, wherein the release is also a mechanical release.

16. The method of claim 12, wherein the second housing support includes two supports and the two supports transition from the stored configuration to the second housing support configuration on bevel gears that rotate about symmetrical canted axes.

17. The method of claim 12, wherein the second housing support includes opposite sliding ends and the opposite ends are pulled towards each other by a tension mechanism and a preformed deformation area allows the second housing support to transition into the second housing support configuration when the release is activated.

18. The method of claim 12, wherein the second housing support includes one sliding end and one secured end and the sliding end is pulled towards the secured end by a tension mechanism and a preformed deformation area allows the second housing support to transition into the second housing support configuration when the release is activated.

19. A system, comprising:
    a second housing support, wherein the second housing support includes a stored configuration and a second housing support configuration, wherein in the stored configuration, the second housing support is retracted into a first housing and in the second housing support configuration, the second housing configuration is configured to support a second housing, wherein a tension mechanism pulls the support into the second housing support configuration when a release is activated, wherein the release is an electrical release.

20. The system of claim 19, wherein the second housing support includes two supports and the two supports transition from the stored configuration to the second housing support configuration on bevel gears that rotate about symmetrical canted axes.

21. The system of claim 19, wherein the second housing support includes opposite sliding ends and the opposite ends are pulled towards each other by a tension mechanism and a preformed deformation area allows the second housing support to transition into the second housing support configuration when a release is activated.

22. The system of claim 19, wherein the second housing support includes one sliding end and one secured end and the sliding end is pulled towards the secured end by a tension mechanism and a preformed deformation area allows the second housing support to transition into the second housing support configuration when a release is activated.

* * * * *